United States Patent [19]

Gitt et al.

[11] 3,997,695

[45] Dec. 14, 1976

[54] PROTECTIVE COVERING FOR FIBERGLASS BOOM

[75] Inventors: Edward Gitt, Media; Donald E. Ryder, Fort Washington; Edward L. Dold, Woodlyn, all of Pa.

[73] Assignee: Gitco, Inc., Clifton Heights, Pa.

[22] Filed: June 12, 1975

[21] Appl. No.: 586,321

[52] U.S. Cl. .................................. 428/36; 156/195; 156/331; 239/159; 428/377; 428/397

[51] Int. Cl.² .................. B31C 13/00; B65H 81/00; C09J 3/00

[58] Field of Search ............ 428/222, 251, 377, 36, 428/373, 383, 398; 156/195, 308, 331; 254/30; 56/273; 239/159

[56] References Cited

UNITED STATES PATENTS

| | | | |
|---|---|---|---|
| 3,005,742 | 10/1961 | Kennedy | 156/308 |
| 3,429,758 | 2/1969 | Young | 428/377 |
| 3,489,631 | 1/1970 | Chen et al. | 428/423 |
| 3,574,104 | 4/1971 | Medler | 428/222 |
| 3,616,185 | 10/1971 | Goldberg | 156/331 |
| 3,657,057 | 4/1972 | Shorr et al. | 156/308 |

*Primary Examiner*—Ralph S. Kendall
*Assistant Examiner*—R. Eugene Varndell, Jr.
*Attorney, Agent, or Firm*—Steele & Petock

[57] ABSTRACT

A protective covering for a fiberglass boom is disclosed. The present invention is particularly useful on the fiberglass boom used on aerial lift trucks used by electrical utilities and for other similar applications. The covering includes a polyurethane coating applied to the surface of the fiberglass boom. Polyurethane strip material is spirally wrapped over the polyurethane coating and bound to the polyurethane coating by the use of a solvent sealer, preferably tetrahydrofuran. A second polyurethane coating may be applied over the polyurethane strip material. The protective covering of the present invention provides resistance to abrasion, weather resistance, and maintains the dielectric strength of the boom. Furthermore, the coating is transparent, allowing inspection for cracks developing in the underlying fiberglass boom.

4 Claims, 2 Drawing Figures

PROTECTIVE COVERING FOR FIBERGLASS BOOM

BACKGROUND OF THE INVENTION

The present invention relates to a protective covering for fiberglass booms. More particularly, the present invention relates to a surface covering for fiberglass booms used on aerial lift trucks which protects the boom from abrasions caused by the boom coming into contact with tree branches and guy wires when the boom is in use.

The present invention relates to mobile aerial lifts of the so-called "cherrypicker" type which conventionally comprise a mobile platform or truck upon which an articulated boom structure is provided for three-dimensional operation. The lower end of the articulated boom structure is conventionally rotatably mounted on the truck body. The other end of the articulated boom structure is provided with a personnel carrying bucket which is usually maintained in a level position, regardless of the position and elevation of the boom.

Such aerial lifts are conventionally used in the construction or maintenance of electrical power lines, and it is quite common for workmen to work on energized high-voltage power lines from the personnel carrying bucket in an elevated position. For this purpose, it is essential in the first instance that the physical structure of the boom be maintained in a good condition so as to be sufficiently strong to support the weight of a workman as well as the equipment which it may be necessary for him to use while in an elevated position. However, due to the fact that workmen, such as linemen and electricians, are often called on to work on energized lines, it is necessary that the boom or a portion of an articulated boom be comprised of a dielectric material such as a fiberglass reinforced polymeric resin (referred to in a number of places herein as "fiberglass"). Even in cases where the aerial lift or cherry picker is used in industries other than the electric utility industry, it is often desirable to have at least a portion of the boom comprised of a dielectric material to provide a safety factor in the event that the boom or bucket accidentally comes in contact with an energized power line. For these reasons, it is important that the insulating or dielectric qualities of the boom be maintained.

The insulating qualities or dielectric strength of the boom may be adversely affected by the accumulation of various contaminating media on the surface of the fiberglass boom. Abrasions and cracks in the surface of a fiberglass boom tend to accumulate contaminating media such as dirt, dust, moisture and other foreign particles.

However, it is also essential that the condition of the fiberglass boom be capable of being visually examined for cracks or other deteriorations of the boom's condition. Therefore, it is important that any covering of the boom be transparent.

SUMMARY OF THE INVENTION

An advantage of the present invention is that it provides a fiberglass boom with significant abrasion resistance.

Another advantage of the present invention is that it provides a fiberglass boom with significant resistance to deterioration caused by the weather.

Another advantage of the present invention is that it preserves and maintains the dielectric strength of the fiberglass boom.

Still another advantage of the present invention is that it provides a fiberglass boom with a protective covering which is transparent, thereby enabling visual inspection of the condition of the fiberglass boom.

Briefly, in accordance with the present invention, a surface covering is provided for a fiberglass reinforced polymeric resin boom comprising a polyurethane coating applied to the surface of the boom and a polyurethane strip material wrapped over the polyurethane coating and bound to the polyurethane coating by the use of a solvent sealer.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
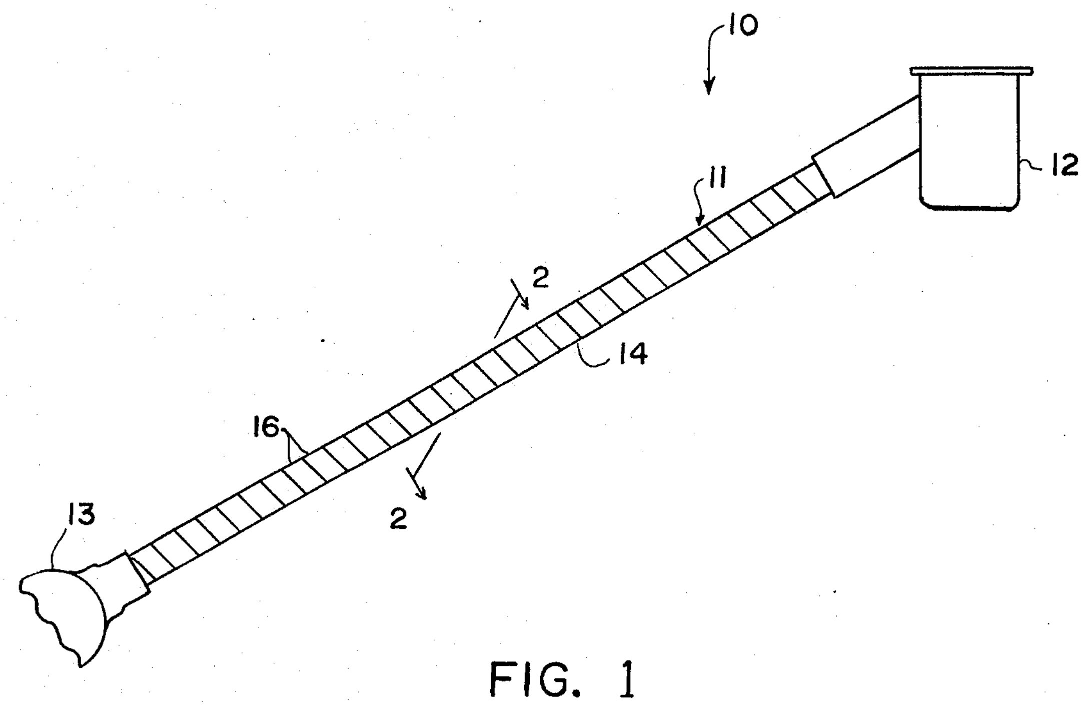
FIG. 1 is a side elevation view of a fiberglass boom provided with a surface covering in accordance with the present invention.

Referring now to the drawings in detail, wherein like numerals indicate like elements, there is shown in FIG. 1 a portion of an aerial lift 10 including a boom 11 and a personnel carrying bucket 12. The aerial lift 10 may be comprised of an articulated structure by means of an elbow joint 13 which would connect to a lower boom section (not shown) of the articulated aerial lift 10. However, it is understood that the present invention applies to providing a protective surface covering to any glass fiber reinforced resin boom (commonly known as fiberglass) used in an aerial lift, whether articulated, single section, telescoping or otherwise.

Figure 2:
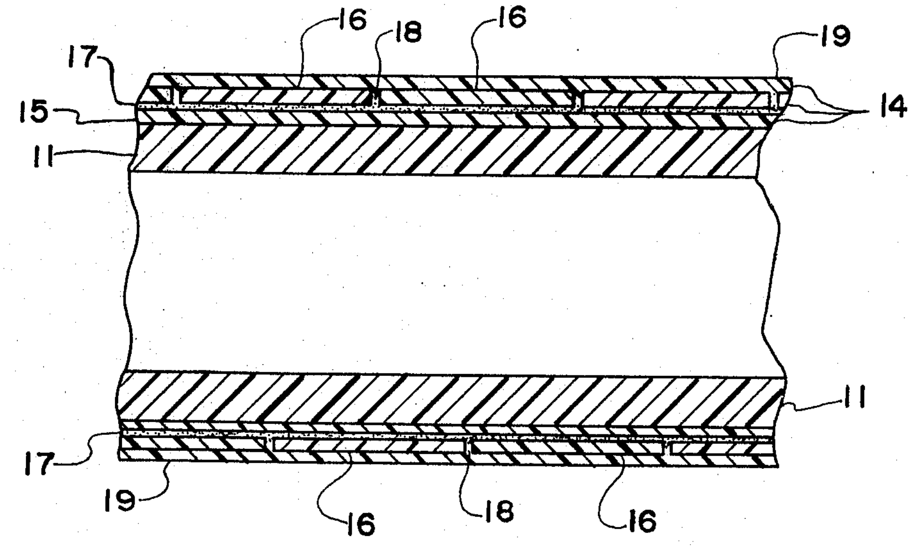
FIG. 2 is a cross sectional view of the boom taken along line 2—2 of FIG. 1 illustrating the surface covering of the boom in accordance with the present invention.

In accordance with the present invention, as may be seen from FIGS. 1 and 2 taken together, the fiberglass boom 11 is provided with a surface covering 14 comprised of a polyurethane coating 15 applied directly to the fiberglass boom 11. Polyurethane coating 15 may be a polyurethane coating sold under the trademark "CHEM-GLAZE" manufactured by Hughes Chemical Division of the Lord Manufacturing Company of Erie, Pa. However, it is understood that other suitable polyurethane coatings may be used.

Polyurethane strip material 16 is spirally wrapped around boom 11 over polyurethane coating 15 and is bonded to polyurethane coating 15 by means of a solvent sealer. The polyurethane strip material 16 is preferably a polyurethane material sold under the trademark "TUFTANE TF310" by the B. F. Goodrich Chemical Company of 6100 Oak Tree Boulevard, Cleveland, Ohio 44131. The polyurethane, which is used for the polyurethane strip material 16, may be purchased in sheet form and slit into strips approximately 6 inches wide.

The polyurethane strip material 16 is preferably bonded to the polyurethane coating 15 by painting or brushing a solvent sealer of the tetrahydrofuran (THF) type onto the outer surface of the polyurethane coating 15 and inner surface of the polyurethane strip material 16 before it is wrapped around the boom. Preferably, the tetrahydrofuran solvent sealer may be of the type sold under the trademark "FLEXCRAFT 782 XD ADHESIVE" by Flexcraft Industries of 527 Avenue "P", Newark, N.J. 07105. However, it is understood that other suitable types of urethane strip material may be used for the polyurethane strip material 16 and other suitable solvent sealers may be used for forming bond 17 as shown in FIG. 2. For example, solvent sealers, such as methyl-ethyl-ketone (MEK) and di-methyl-formamide (DMF) may be used as solvent sealers to form bond 17.

Preferably, a small space 18 may be provided between the spiral wraps of the polyurethane strip material 16. The spaces 18 tend to allow the escape of any moisture which may possibly appear under the polyurethane strip material 16. In certain cases, it may be desirable to provide a polyurethane coating 19 over the polyurethane strip material 16. Polyurethane coating 19 may be comprised of the same material as polyurethane coating 15 or any other suitable polyurethane coating.

The surface covering 14 provides a transparent tough abrasion resistant covering for the fiberglass boom 11. Covering 14 provides resistance to the often adverse weather conditions encountered by aerial lift trucks. Furthermore, and just as importantly, the covering 14 enables maintanance of a high dielectric strength for the fiberglass boom 14. The covering 14 prevents the accumulation of dirt, moisture, and other foreign matter on the surface and in minute cracks of the fiberglass boom 11.

The present invention may be embodied in other specific forms without departing from the spirit or essential attributes thereof and, accordingly, reference should be made to the appended claims, rather than to the foregoing specification as indicating the scope of the invention.

We claim:

1. In an aerial lift including a boom comprised of a fiberglass reinforced polymeric resin, a surface covering for said boom, comprising:

polyurethane coating applied to the surface of said boom; and polyurethane strip material spirally wrapped over said polyurethane coating and bound to said polyurethane coating by use of a solvent sealer selected from the group consisting of tetrahydrofuran, methyl-ethyl-ketone and di-methyl-formamide.

2. A surface covering for a boom in accordance with claim 1 including a second polyurethane coating applied over said polyurethane strip material.

3. A surface covering for a boom in accordance with claim 1 wherein a space of approximately 1/16th of an inch is provided between the spiral wraps of said polyurethane strip material.

4. A surface covering for a boom in accordance with claim 1 wherein both said polyurethane coating and said polyurethane strip material are transparent.

* * * * *